United States Patent [19]

Knollman et al.

[11] 3,973,380

[45] Aug. 10, 1976

[54] CROP FEEDING MECHANISM FOR A HARVESTING MACHINE

[75] Inventors: Melvin Louis Knollman; George Kent Cornish, both of East Moline; Gene Roger Fowler, Geneseo, all of Ill.

[73] Assignee: Deere & Company, Moline, Ill.

[22] Filed: July 16, 1975

[21] Appl. No.: 596,435

[52] U.S. Cl. .................................. 56/14.6; 56/33; 198/82
[51] Int. Cl.² ...................................... A01D 45/02
[58] Field of Search .................. 56/13.3, 12.4, 12.5, 56/14.5, 14.6, 33; 198/82, 104, 105, 167, 209, 211, 212

[56] References Cited
UNITED STATES PATENTS

| | | | |
|---|---|---|---|
| 3,156,245 | 11/1964 | Hobbs | 130/27 |
| 3,826,350 | 7/1974 | Fowler et al. | 56/12.4 X |

*Primary Examiner*—Russell R. Kinsey

[57] ABSTRACT

A self-propelled combine has a forward transversely elongated harvesting platform mounted on the forward end of a forwardly and downwardly inclined feeder housing through which the crop is fed to a separating mechanism in the combine body. A plurality of axially transverse paddle type impellers are mounted in the feeder housing and extend between the opposite sides of the housing immediately above the housing floor, the impellers being rotated in the same direction so that the impeller paddles move rearwardly along the floor, whereby the crop material is engaged by successive paddles and moved upwardly and rearwardly along the housing floor to the separating mechanism. The axes of the impellers lie in the same general upwardly and rearwardly inclined plane, and a number of baffles are provided between adjacent paddles to prevent the carryover material forwardly along the tops of the impellers and to strip material from the impellers, the baffles extending between the opposite sides of the housing and also functioning to strengthen the housing.

4 Claims, 2 Drawing Figures

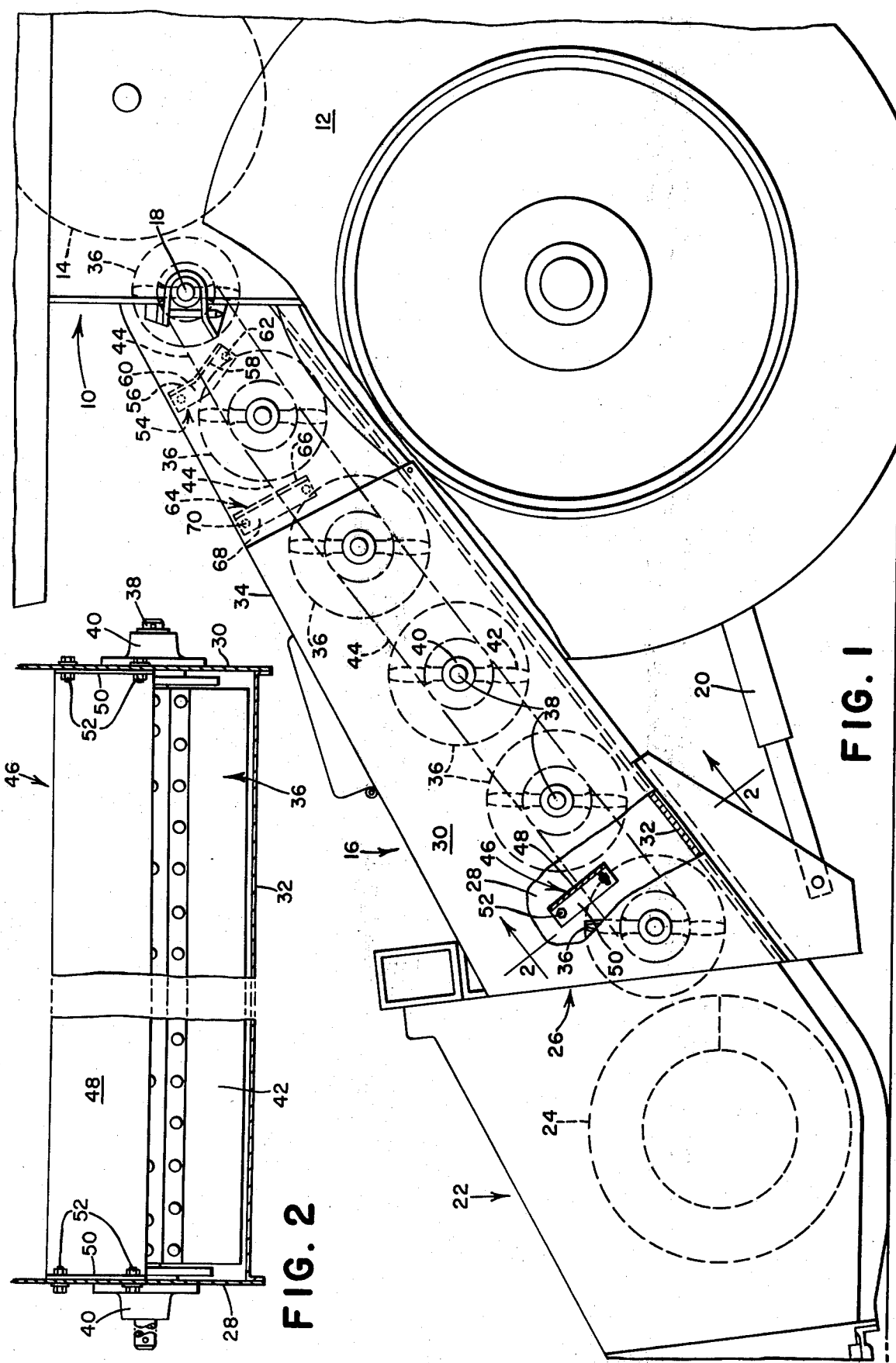

3,973,380

CROP FEEDING MECHANISM FOR A HARVESTING MACHINE

BACKGROUND OF THE INVENTION

This invention relates to a crop feeding mechanism for an agricultural harvesting machine, such as a combine or the like, and more particularly to an improved paddle type feeding mechanism of the type that utilizes a series of adjacent parallel rotary impellers that successively engage crop material and move it along a surface.

Such paddle type feeding mechanism are well known, such a feeding mechanism being shown in U.S. Pat. No. 3,826,350, which is also assigned to the assignee herein.

One of the problems encountered with such a feeding mechanism has been the carryover of material along the top sides of the impellers, so that the material is fed back toward the harvesting platform.

SUMMARY OF THE INVENTION

According to the present invention, there is provided an improved conveying mechanism of the above general type. More specifically, one or more baffles or bulkheads are provided between adjacent impellers, generally above the plane formed by axes of the impellers, to prevent the carryover of material along the tops of the impellers. An important feature of the invention is to attach the baffles to the opposite side walls of the housing that encloses the conveying mechanism, the baffles or bulkheads bracing the housing to increase the strength and rigidity of the housing. Also according to the invention, such a baffle is provided immediately in front of the rearwardmost impeller, which on a combine is immediately adjacent to the forward side of a threshing cylinder, the rear baffle preventing the carryover of the combine tailings which are conventionally fed to the front side of the threshing cylinder above the rearward end of the conveying mechanism.

BRIEF DESCRIPTION OF THE DRAWINGS

FIG. 1 is a partly schematic side elevation view of the forward portion of a self-propelled combine embodying the improved feeding mechanism, portions of the combine and a feeder housing side wall being broken away to more clearly illustrate the invention.

FIG. 2 is a generally upright transverse section through the feeder housing as viewed generally along the line 2—2 of FIG. 1.

DESCRIPTION OF THE PREFERRED EMBODIMENT

The invention is embodied in a self-propelled combine having a main separator body 10 mounted on a pair of forward drive wheels 12, only the forward portion of the combine being illustrated. The combine body has a forward crop inlet immediately in front of an axially transverse threshing cylinder 14, the inlet spanning the width of the body and communicating with the rearward discharge end of a forwardly extending feeder house, indicated in its entirety by the numeral 16. As is conventional, the feeder house is mounted for vertical adjustment on the body 10 about a transverse pivot 18 at the rear of the feeder house, the feeder house being vertically adjustable about the pivot 18 by means of a pair lift cylinders 20 operative between the forward end of the feeder house and the combine body.

A forward transversely elongated harvesting platform 22 is mounted on the forward end of the feeder house and includes a transversely extending crop converging auger 24 that moves the crop to the center of the platform and discharges it rearwardly through an opening in the rear wall of the platform, the opening communicating with an open front end or inlet 26 of the feeder house. All of the above represents more or less conventional combine construction.

The feeder house 16 has a generally rectangular cross-section, with opposite, upright, right and left side walls 28 and 30 respectively, an upwardly and rearwardly inclined floor or bottom wall 32 and a similar upwardly and rearwardly inclined top wall 34, the front and rear ends of the feeder house being opened as previously described. Mounted within the housing formed by the four walls are six rotary, axially transverse, parallel rotary, paddle type impellers indicated generally by the numeral 36. Each of the impellers is identical except for the two rearwardmost impellers, which have smaller diameters than the other impellers, although they are of the same general construction, the rear impeller being smaller than the second impeller from the rear. The axes of all the impellers substantially lie in a common upwardly and rearwardly inclined plane, the axes of the two rearward impellers being slightly below the plane, although, as is apparent, all the impellers are in substantial alignment and the bottom of impellers are aligned and adjacent the floor 32. The construction of the impellers is described in greater detail in said U.S. Pat. No. 3,826,350, each impeller including a transverse axial shaft 38 extending between and journaled in a pair of bearings on the opposite side walls, the rearwardmost impeller being coaxial with the feeder house pivot 18. Each impeller includes a pair of radial flexible paddles 42 that substantially span the width of the feeder house.

The impellers are rotated in a counterclockwise direction, as viewed in FIG. 1 by a series of similar chain drives 44, each drive connecting an impeller to the rearwardly adjacent impeller and consisting of a chain drive interconnecting drive and driven sprockets on the respective impeller shafts. The rearwardmost impeller is driven by a conventional drive that normally includes a driven element coaxial with the feeder house pivot 18.

As is apparent, the impellers are closely spaced so that crop material discharged through the inlet 26 is engaged by the forwardmost impeller and conveyed rearwardly and upwardly along the floor, the crop then being engaged by successive impellers so that it is fed upwardly and rearwardly along the floor to the threshing cylinder 14.

A transverse front baffle or bulkhead 46 spans the width of the housing between the front impeller and the second impeller from the front. The baffle includes a flat central portion 48, that extends between the opposite sidewalls and is generally normal to the floor, and a pair of flanges 50 at its opposite ends seating against the opposite side walls, the baffle being removably attached to the side walls by fasteners 72 extending through the side walls and the flanges 50. As is apparent, the top edge of the central portion 48 lies in the same general inclined plane as the tops of the impellers, while the lower edge of the central portion lies in substantially the same plane as the axes of the two adjacent impellers.

A similar rear baffle or bulkhead 54 extends between the opposite housing side walls between the rearwardmost impeller and the impeller forwardly thereof. The rear baffle or bulkhead 54 includes a flat upper portion 56 generally normal to the top wall and a flat lower portion 58 that is inclined downwardly and rearwardly from the upper portion, the rear baffle again including a pair of flanges 60 at opposite ends that are fastened to the opposite side walls by fasteners 62. As is apparent, the top edge of the rear baffle 54 is adjacent to the top wall, while the lower edge lies in substantially the same plane as the axes of the impellers.

A third or center baffle 64 is disposed between the fourth and the fifth impellers from the front, the baffle 64 being similar to the other baffles and including a flat portion 66 extending between the opposite side walls normal to the top wall and having an upper edge adjacent to the top wall and a lower edge substantially on the same plane as the axes of the impellers. The baffle 64 also has flanges 68 at its opposite ends for attachment to the opposite side walls by fasteners 70.

In operation, the impellers rotate in a counterclockwise direction as viewed in FIG. 1 to move the crop materials along the floor 32 from the platform 22 to the threshing cylinder 14. The baffles or bulkheads function as strippers for the impellers of the respective baffles. The baffles also prevent the carryover of material along the top side of the rotating impellers to prevent the return of material to the platform. Since tailings are conventionally recycled to the front side of the threshing cylinder, the tailings are frequently engaged by the rearwardmost impeller and, some of the tailings are impelled forwardly thereby. The rear baffle 54 intercepts the forward movement of the materials and deflects it downwardly underneath the rear impeller so that it is directed to the threshing cylinder.

The baffles also perform the additional function of strengthening the feeder housing by providing lateral bracing for the feeder housing, and thereby allowing the use of a lighter gauge of sheet metal in the housing walls.

We claim:
1. In a harvesting machine having a mobile body housing a crop treating mechanism including a transversely disposed threshing cylinder, a forward harvesting means adapted to remove crop material from a field as the machine advances, and a feeder mechanism disposed between the harvesting means and the threshing cylinder for conveying crop material from the harvesting means to the threshing cylinder and including a generally fore-and-aft housing having opposite side walls, an upwardly and rearwardly inclined floor, a series of more than three parallel axially transverse closely spaced paddle-type impellers extending between the side walls above the floor and having generally radial paddle members, the axes of the impellers lying generally in an upwardly and rearwardly inclined plane, the rearmost impeller being disposed so as to deliver crop material to the threshing cylinder and drive means operative to rotate the impellers so that the tips of the paddle members move rearwardly immediately above the floor, the improvement comprising: a first baffle member disposed adjacent the forward side of the rearmost impeller and extending between the opposite side walls of the housing whereby any tendency to backfeeding from the threshing cylinder and the rearmost impeller in the housing above the impellers is overcome and a second baffle member extending between the opposite side walls and disposed between the front impeller and the impeller immediately rearwardly thereof, each baffle member including at least a portion above said plane defined by the axes of the impellers and having a lower edge spaced from said floor.

2. The invention defined in claim 1 wherein said lower edges lie approximately in said general plane formed by the impeller axes.

3. The invention defined in claim 2 wherein the housing includes a top wall and said first baffle member has an upper edge disposed adjacent to the top wall.

4. The invention defined in claim 2 and including a third baffle member disposed between a different pair of adjacent impellers than the other baffle members.

* * * * *